(12) United States Patent
Piefer (10) Patent No.: US 10,734,126 B2
(45) Date of Patent: Aug. 4, 2020

(54) METHODS OF SEPARATING MEDICAL ISOTOPES FROM URANIUM SOLUTIONS

(75) Inventor: Gregory Piefer, Middleton, WI (US)

(73) Assignee: SHINE Medical Technologies, LLC, Janesville, WI (US)

(*) Notice: Subject to any disclaimer, the term of this patent is extended or adjusted under 35 U.S.C. 154(b) by 0 days.

(21) Appl. No.: 13/460,033

(22) Filed: Apr. 30, 2012

(65) Prior Publication Data
US 2012/0300891 A1 Nov. 29, 2012

Related U.S. Application Data

(60) Provisional application No. 61/480,214, filed on Apr. 28, 2011.

(51) Int. Cl.
| | | |
|---|---|---|
| *G21G 1/00* | (2006.01) | |
| *C01G 39/00* | (2006.01) | |
| *G21F 9/12* | (2006.01) | |
| *C22B 3/42* | (2006.01) | |
| *G21C 19/46* | (2006.01) | |
| *C22B 34/34* | (2006.01) | |
| *B01D 59/24* | (2006.01) | |
| *C22B 34/30* | (2006.01) | |

(Continued)

(52) U.S. Cl.
CPC ............. *G21G 1/001* (2013.01); *B01D 59/24* (2013.01); *C01G 39/003* (2013.01); *C01G 43/003* (2013.01); *C22B 3/42* (2013.01); *C22B 34/30* (2013.01); *C22B 34/34* (2013.01); *C22B 60/0265* (2013.01); *G21C 19/46* (2013.01); *G21F 9/12* (2013.01); *G21F 9/125* (2013.01); *G21G 2001/0036* (2013.01)

(58) Field of Classification Search
CPC .... G21C 19/46; C01G 56/001; C01G 56/002; C01G 39/00; C01G 39/0036; C01G 43/003; C01G 39/003; C22B 60/026; C22B 34/30; C22B 34/34; C22B 34/42; C22B 60/0265; B01D 11/00; G21G 1/001; G21G 2001/0036; G21F 9/12; G21F 9/125
USPC ......................................................... 376/186
See application file for complete search history.

(56) References Cited

U.S. PATENT DOCUMENTS

| | | |
|---|---|---|
| 2,161,985 A | 6/1939 | Szilard |
| 2,837,476 A | 6/1958 | Busey |

(Continued)

FOREIGN PATENT DOCUMENTS

| | | |
|---|---|---|
| CA | 2294063 | 12/1998 |
| CN | 1134197 | 10/1996 |

(Continued)

OTHER PUBLICATIONS

Peter Tkac, Alena Paulenova "Speciation of Molybdenum (VI) in Aqueous and Organic Phases of Selected Extraction Systems" Separation Science and Technology 43:2641-2675 (2008).*

(Continued)

*Primary Examiner* — Lily C Garner
(74) *Attorney, Agent, or Firm* — Michael Best & Friedrich LLP (57) ABSTRACT

Provided are methods to separate an isotope from a first solution including uranium. The methods may include (a) cleaning the first solution to form a second solution including the uranium and a third solution including the isotope; (b) oxidizing the third solution to form an oxidized isotope; and (c) separating the oxidized isotope.

17 Claims, 2 Drawing Sheets

(51) Int. Cl.
*C22B 60/02* (2006.01)
*C01G 43/00* (2006.01)

(56) References Cited

U.S. PATENT DOCUMENTS

| | | | |
|---|---|---|---|
| 2,853,446 A | 9/1958 | Abbott et al. | |
| 2,907,884 A | 10/1959 | Gale | |
| 2,992,333 A | 7/1961 | Gale | |
| 3,030,543 A | 4/1962 | Luce | |
| 3,079,319 A | 2/1963 | McGrath et al. | |
| 3,085,966 A | 4/1963 | Flora | |
| 3,218,235 A | 11/1965 | Ehler | |
| 3,258,402 A | 6/1966 | Farnsworth | |
| 3,276,965 A | 10/1966 | Leyse | |
| 3,386,883 A | 6/1968 | Farnsworth | |
| 3,418,206 A | 12/1968 | Hall et al. | |
| 3,448,314 A | 6/1969 | Bounden et al. | |
| 3,473,056 A | 10/1969 | Ferry | |
| 3,530,497 A | 9/1970 | Hirsch et al. | |
| 3,617,908 A | 11/1971 | Greber | |
| 3,624,240 A | 11/1971 | Damm et al. | |
| 3,629,588 A | 12/1971 | Eyrich | |
| 3,634,704 A | 1/1972 | Stix et al. | |
| 3,663,858 A | 5/1972 | Lisitano | |
| 3,668,066 A | 6/1972 | Hendel et al. | |
| 3,676,672 A | 7/1972 | Meckel et al. | |
| 3,713,967 A | 1/1973 | Hamilton et al. | |
| 3,718,836 A | 2/1973 | Bain et al. | |
| 3,719,893 A | 3/1973 | dePackh | |
| 3,746,859 A | 7/1973 | Hilton et al. | |
| 3,794,875 A | 2/1974 | Stark | |
| 3,799,883 A * | 3/1974 | Arino | G21G 1/08 252/645 |
| 3,925,676 A | 12/1975 | Bigham et al. | |
| 3,992,625 A | 11/1976 | Schmidt et al. | |
| 4,008,411 A | 2/1977 | Brugger et al. | |
| 4,137,012 A | 1/1979 | Porta et al. | |
| 4,147,590 A | 4/1979 | Szekely | |
| 4,202,725 A | 5/1980 | Jarnagin | |
| 4,311,912 A | 1/1982 | Givens | |
| 4,314,879 A | 2/1982 | Hartman et al. | |
| 4,370,295 A | 1/1983 | Bussard | |
| 4,431,580 A * | 2/1984 | Schneider | C22B 60/0265 210/670 |
| 4,528,003 A | 7/1985 | Dittrich et al. | |
| 4,529,571 A | 7/1985 | Bacon et al. | |
| 4,650,630 A | 3/1987 | Boyer | |
| 4,663,110 A | 5/1987 | Cheng | |
| 4,752,432 A | 6/1988 | Bida et al. | |
| 4,793,961 A | 12/1988 | Ehlers et al. | |
| 4,800,060 A | 1/1989 | Goldring | |
| 4,826,646 A | 5/1989 | Bussard | |
| 4,853,173 A | 8/1989 | Stenbacka | |
| 4,976,938 A | 12/1990 | Knize et al. | |
| 5,037,602 A | 8/1991 | Dabiri et al. | |
| 5,053,184 A | 10/1991 | Cluzeau et al. | |
| 5,126,574 A | 6/1992 | Gallagher | |
| 5,152,956 A | 10/1992 | Bernardet et al. | |
| 5,215,703 A | 6/1993 | Bernardet | |
| 5,280,505 A | 1/1994 | Hughey et al. | |
| RE34,575 E | 4/1994 | Klinkowstein et al. | |
| 5,410,574 A | 4/1995 | Masumoto et al. | |
| 5,468,355 A | 11/1995 | Shefer et al. | |
| 5,482,865 A | 1/1996 | Ferrieri et al. | |
| 5,508,010 A * | 4/1996 | Sameh | C01G 39/003 423/2 |
| 5,586,153 A | 12/1996 | Alvord | |
| 5,596,611 A * | 1/1997 | Ball | 376/189 |
| 5,729,580 A | 3/1998 | Millspaugh | |
| 5,745,536 A | 4/1998 | Brainard et al. | |
| 5,745,537 A | 4/1998 | Verschoore | |
| 5,812,621 A | 9/1998 | Takeda et al. | |
| 5,854,531 A | 12/1998 | Young et al. | |
| 5,870,447 A | 2/1999 | Powell et al. | |
| 5,898,279 A | 4/1999 | Ezzedine et al. | |
| 5,910,971 A | 6/1999 | Ponomarev-Stepnoy et al. | |
| 5,920,601 A | 7/1999 | Nigg et al. | |
| 5,940,461 A | 8/1999 | Takeda et al. | |
| 5,977,554 A | 11/1999 | Smith et al. | |
| 6,011,825 A | 1/2000 | Welch et al. | |
| 6,141,395 A | 10/2000 | Nishimura et al. | |
| 6,337,055 B1 | 1/2002 | Betenekov et al. | |
| 6,417,634 B1 | 7/2002 | Bergstrom | |
| 6,544,606 B1 | 4/2003 | Pennington et al. | |
| 6,567,492 B2 | 5/2003 | Kiselev et al. | |
| 6,593,686 B1 | 7/2003 | Yui | |
| 6,777,699 B1 | 8/2004 | Miley et al. | |
| 6,835,358 B2 | 12/2004 | Hemingway et al. | |
| 6,845,137 B2 | 1/2005 | Ruth et al. | |
| 6,850,011 B2 | 2/2005 | Monkhorst et al. | |
| 6,870,894 B2 | 3/2005 | Leung et al. | |
| 6,891,911 B2 | 5/2005 | Rostoker et al. | |
| 6,907,097 B2 | 6/2005 | Leung | |
| 6,917,044 B2 | 7/2005 | Amini | |
| 6,922,455 B2 | 7/2005 | Jurczyk et al. | |
| 6,925,137 B1 | 8/2005 | Forman | |
| 7,200,198 B2 | 4/2007 | Wieland et al. | |
| 7,230,201 B1 | 6/2007 | Miley et al. | |
| 7,235,216 B2 | 6/2007 | Kiselev et al. | |
| 7,342,988 B2 | 3/2008 | Leung et al. | |
| 7,362,842 B2 | 4/2008 | Leung | |
| 7,419,604 B1 | 9/2008 | Atwood | |
| 7,968,838 B2 | 6/2011 | Dent | |
| 7,978,804 B2 | 7/2011 | Groves et al. | |
| 8,475,747 B1 * | 7/2013 | Johnson | 423/7 |
| 8,767,905 B2 | 7/2014 | Neeley et al. | |
| 2002/0150193 A1 | 10/2002 | Leung et al. | |
| 2003/0152186 A1 | 8/2003 | Jurczyk et al. | |
| 2003/0223528 A1 | 12/2003 | Miley et al. | |
| 2004/0100214 A1 | 5/2004 | Erdman | |
| 2005/0061994 A1 | 3/2005 | Behrouz | |
| 2005/0069076 A1 | 3/2005 | Bricault et al. | |
| 2005/0082469 A1 | 4/2005 | Carlo | |
| 2005/0129162 A1 | 6/2005 | Ruth et al. | |
| 2006/0017411 A1 | 1/2006 | Hamm | |
| 2006/0023829 A1 | 2/2006 | Schenter et al. | |
| 2006/0062342 A1 | 3/2006 | Lepera et al. | |
| 2006/0104401 A1 | 5/2006 | Jongen et al. | |
| 2007/0036261 A1 | 2/2007 | Kim et al. | |
| 2007/0108922 A1 | 5/2007 | Amaldi | |
| 2007/0133734 A1 | 6/2007 | Fawcett et al. | |
| 2007/0160176 A1 | 7/2007 | Wada | |
| 2007/0273308 A1 | 11/2007 | Fritzler et al. | |
| 2007/0297554 A1 | 12/2007 | Lavie et al. | |
| 2008/0023645 A1 | 1/2008 | Amelia et al. | |
| 2008/0224106 A1 * | 9/2008 | Johnson | G21C 19/46 252/625 |
| 2009/0129532 A1 | 5/2009 | Reyes, Jr. et al. | |
| 2009/0213977 A1 | 8/2009 | Russell, II et al. | |
| 2009/0225923 A1 | 9/2009 | Neeley et al. | |
| 2009/0279658 A1 | 11/2009 | Leblanc | |
| 2009/0316850 A1 | 12/2009 | Langenbrunner | |
| 2010/0063344 A1 | 3/2010 | Kotschenreuther et al. | |
| 2010/0193685 A1 | 8/2010 | Chu et al. | |
| 2010/0284502 A1 | 11/2010 | Piefer | |
| 2011/0051876 A1 | 3/2011 | Ahfeld et al. | |
| 2011/0091000 A1 | 4/2011 | Stubbers et al. | |
| 2011/0176648 A1 | 7/2011 | Rowland et al. | |
| 2011/0180698 A1 | 7/2011 | Stephenson | |
| 2012/0300890 A1 | 11/2012 | Pfiefer | |
| 2012/0300891 A1 | 11/2012 | Pfiefer | |
| 2015/0092900 A1 | 4/2015 | Piefer et al. | |
| 2019/0105630 A1 * | 4/2019 | Hasan | B01J 20/24 |

FOREIGN PATENT DOCUMENTS

| | | |
|---|---|---|
| CN | 1922695 | 2/2007 |
| CN | 102084434 | 6/2011 |
| EP | 535235 | 4/1993 |
| EP | 0632680 | 1/1995 |
| EP | 1134 771 | 9/2001 |
| EP | 1233425 A1 | 8/2002 |
| FR | 2711835 | 5/1995 |
| GB | 829093 A | 2/1960 |

(56) References Cited

FOREIGN PATENT DOCUMENTS

| | | |
|---|---|---|
| GB | 1187244 A | 4/1970 |
| JP | 40-24599 | 10/1965 |
| JP | 59068143 | 4/1984 |
| JP | 03190097 | 8/1991 |
| JP | 6160595 | 6/1994 |
| JP | 09113693 | 5/1997 |
| JP | 11057043 | 3/1999 |
| JP | 2001042098 | 2/2001 |
| JP | 3145555 B2 | 3/2001 |
| JP | 2001338800 | 12/2001 |
| JP | 2002062388 | 2/2002 |
| JP | 2002214395 | 7/2002 |
| JP | 2005127800 | 5/2005 |
| JP | 2007165250 | 6/2007 |
| JP | 2008102078 | 5/2008 |
| RU | 2004115750 | 5/2005 |
| WO | WO 91/14268 | 9/1991 |
| WO | WO 98/59347 | 12/1998 |
| WO | WO 01/03142 | 1/2001 |
| WO | WO 01/31678 | 5/2001 |
| WO | WO 03/019996 | 3/2003 |
| WO | WO 04/053892 | 6/2004 |
| WO | WO 06/000104 | 1/2006 |
| WO | WO 06/015864 | 2/2006 |
| WO | WO 07/002455 | 1/2007 |
| WO | WO 07/040024 | 4/2007 |
| WO | WO 09/100063 | 8/2009 |
| WO | WO 2009/135163 | 11/2009 |
| WO | WO 2009/142669 | 11/2009 |
| WO | WO 2013187974 | 12/2013 |

OTHER PUBLICATIONS

Bürck, J., Sameh A. Ali, and H. J. Ache. "Sorption Behaviour of Molybdenum on Different Metal Oxide Ion Exchangers." Solvent Extraction and Ion Exchange 6.1 (1988): 167-182. abstract available online: <https://www.tandfonline.com/doi/abs/10.1080/07366298808917930>. (Year: 1988).*
Japanese Office Action for Application No. 2011/507694 dated Jul. 24, 2014 (3 pages).
"The Burr Amendment" "2005 Energy Act," Congressional Record, pp. S7237-S7244 (Jun. 23, 2005).
"The Schumer Amendment" "Comprehensive Report on H.R. 776" Congressional Record, p. H12103 (Oct. 5, 1992).
"U.S. Radioisotope Supply," American Nuclear Society Position Statement 30:(Jun. 2004).
Abraham, S., "Remarks by Energy Secretary Spencer Abraham on the Global Threat Reduction Initiative," Speech to the International Atomic Energy Agency, Vienna, Austria, (May 26, 2004).
Agostinelli, S., et al, "Geant4-A Simulation Toolkit," Nuclear Instruments and Methods in Physics Research A, 506:250-303 (2003).
Angelone, M. et al., "Conceptual Study of a Compact Accelerator-Driven Neutron Source for Radioisotope Production, Boron Neutron Capture Therapy and Fast Neutron Therapy," Nuc. Instr. & Methods in Physics Res. A:487:585-594 (2002).
Armstrong, D.D. et al., "Progress Report on Testing of a 100-kV, 125-mA Deuterium Injector," IEEE Transactions on Nuclear Science NS-26, No. 3 (1979).
Armstrong, D.D. et al., "Tests of the Intense Neutron Source Prototype" IEEE Transactions on Nuclear Science NS-26, No. 3 (1979).
Austen, I., "Reactor Shutdown Causing Medical Isotope Shortage," The New York Times, (Dec. 6, 2007).
Bakel, A.J. et al., "Thermoxid Sorbents for the Separation and Purification of 99Mo," 26th International Meeting on RERTR, Vienna, Austria, (Nov. 7-12, 2004).
Ball, R.M. et al., "Present Status of the Use of LEU in Aqueous Reactors to Produce Mo-99," 1998 International Meeting on Reduced Enrichment for Research and Test Reactors, Sao Paulo,( Oct. 18-23, 1998).

Barbry, F. "Criticality Accident Studies and Research Performed in the Valduc Criticality Laboratory, France," IAEA-TECDOC-1601: 39-48 (2008).
Barnett, C.F., "Atomic Data for Fusion, vol. 1: Collisions of H, H2, He and Li Atoms with Molecules," ORNL "Redbooks" 6086 (1990).
Barschall, H.H., "Intense Sources of Fast Neutrons," Ann. Rev. Nuclear Part. Sci. 28:207-237 (1978).
Biodex, Pulmonex II® Xenon System: http://www.biodex.com/radio/lungvent/lung_502feat.htm. Accessed: (Jun. 1 2010).
Bosch, H., et al. "Improved Formulas for Fusion Cross-Sections and Thermal Reactivities," Nuclear Fusion 32:4: 611-631 (1992).
Bradley, E. et al., "Homogeneous Aqueous Solution Nuclear Reactors for the Production of Mo-99 and Other Short Lived Radioisotopes," IAEA-TECDOC-1601: 1-13 (2008).
Brown, R. W., "The Radiopharmaceutical Industry's Effort to Migrate Toward Mo-99 Production Utilizing LEU," The 2005 RERTR International Meeting, (Nov. 6-10, 2005).
Bunker, M.E. "Status Report on the Water Boiler Reactor," Los Alamos Technical Reports LA-2854 (Oct. 1963).
Calamai, P., "Chalk River Crisis Sired by AECL," TheStar.com, (Jan. 19, 2008).
Cappiello, C. et al., "Lessons Learned from 64 Years of Experience with Aqueous Homogeneous Reactors," Los Alamos National Laboratory Report LA-UR-10-02947 (May 2010).
Celona, L. et al., "Status of the Trasco Intense Proton Source and Emittance Measurements," Rev. of Sci. Instrum. 75:5: 1423 (2004).
Chakin, V.P., et al. "High dose neutron irradiation damage in beryllium as blanket material," Fusion Engineering and Design 58-59: 535-541 (Nov. 2001).
Chenevert, G.M. et al., "A Tritium Gas Target as an Intense Source of 14 MeV Neutrons," Nucl. Instr. and Methods 145: 149-155 (1977).
Cheng, Z. et al., "Preliminary Study of 99Mo Extraction Process from Uranly[sic]-Nitrate Fuel Solution of Medical Isotope Production Reactor," Homogeneous Aqueous Solution Nuclear reactors for the Production of Mo-99 and Other Short Lived Radioisotopes, IAEA-TECDOC-1601: 27-35 (2008).
Cipiti, B.B., "Fusion Transmutation of Waste: Design and Analysis of the In-Zinerator Concept," Sandia Report, SAND2006-6590, (Nov. 2006).
Cohilis, P., "Recent Advances in the Design of a Cyclotron-Driven, Intense, Subcritical Neutron Source," *Proc. Of the Fifth European Particle Physics Conference*, EPAC'96, (Jun. 10-14, 1996).
Committee on Medical Isotope Production Without Highly Enriched Uranium, National Research Council of the National Academies. Medical Isotope Production Without Highly Enriched Uranium. The National Academies Press, Washington, DC (2009). http://www.nap.edu/catalog.php?record_id=12569 Accessed (Jun. 1, 2010).
Conner, C. et al., "Production of Mo-99 from LEU Targets Acid-side Processing," 2000 Meeting on Reduced Enrichment for Research and Test Reactors, Las Vegas, Nevada, (Oct. 1-6, 2000).
DeJesus, O.T. et al., "Preparation and Purification of 77Br-Labeled p-Bromospiroperidol Suitable for in vivo Dopamine Receptor Studies," J. Label. Comp. Radiopharm., 20: 745-756 (1983).
Deluca, P.M., "Performance of a Gas Target Neutron Source for Radiotherapy," Phys. Med. Biol., 23:5: 876-887 (1978).
Demchenko, P.O., "A Neutron Source on a Basis of a Subcritical Assembly Driven by a Deuteron Linac," Problems of Atomic Science and Technology, 46:2:31-33 (2006).
Department of Defense. "Technology Readiness Assessment (TRA) Deskbook," (May 2005).
European Patent Office Action for Application No. 09739965.3 dated Sep. 19, 2012 (4 pages).
Evaluated Nuclear Data File (ENDF): http://www-nds.iaea.org/exfor/endf.htm. Database Version of May 31, 2010. Accessed (May 3, 2010).
Fraser, S., "Special Examination Report on Atomic Energy of Canada Limited—2007, OAG Special Examination Report on Atomic Energy of Canada Limited", (Jan. 29, 2008).
Ganjali, M.R. et al., "Novel Method for the Fast Separation and Purification of Molybdenum(VI) from Fission Products of Uranium with Aminofunctionalized Mesoporous Molecular Sieves (AMMS)

(56) References Cited

OTHER PUBLICATIONS

Modified by Dicyclohexyl-18-Crown-6 and S—N Tetradentate Schiff's Base," Analytical Letters, 38:1813-1821 (2005).
Gobin, R. et al., "High Intensity ECR Ion Source (H+, D+, H—Developments at CEA/Saclay," Rev. of Sci. Instrum. 73:2: 922 (2002).
Gohar, Y., "Accelerator-driven Subcritical Facility: Conceptual Design Development," Nuclear Instruments and Methods in Physics Research A, 562:870-874 (2006).
Hamilton, T., "Reactor Shutdown Leaves Cancer Patients in Limbo," TheStar.com, (Dec. 5, 2007).
IAEA, "Alternative Technologies for 99mTc Generators," IAEA-TECDOC-852, (Dec. 1995).
Kahn, L.H., "The Potential Dangers in Medical Isotope Production," The Bulletin Online, (Mar. 17, 2008).
King, LDP; Hammond, RP; Leary, JA; Bunker, ME; Wykoff, WR. "Gas Recombination System for a Homogeneous Reactor," Nucleonics 11:9:25-29 (Sep. 1953).
Kitten, S. et al., "Solution-reactor-produced Mo-99 using activated carbon to remore[sic] 1-131," Los Alamos National Laboratory Report, LA-UR--98-522 (Jun. 1998).
Kulcinski, G.L. "Near Term Commercial Opportunities from Long Range Fusion Research," 12th Annual Meeting on the Technology of Fusion Power, (Jun. 16-20, 1996).
Kulcinski, G.L., et al., "Alternate Applications of Fusion-Production of Radioisotopes" Fusion Science and Technology 44:559 (2003).
Kuperman, A.J., "Bomb-Grade Bazaar," Bulletin of the Atomic Scientists, 62:2:44-50 (Mar./Apr. 2006).
Kwan, J.D. et al., "A 2.45 GHz High Current Ion Source for Neutron Production," 17th International Workshop on ECR Ion Sources and Their Applications, Lanzhou, China, (Sep. 17-21, 2006).
Maclachlan, A. "NRG to Study Potential for Use of LEU for Mo-99," Nuclear Fuel, 32:26, (Dec. 17, 2007).
MDS-Nordion. "Mo-99 Fact Sheet: Molybdenum-99 Fission Radiochemical": http://www.nordion.com/documents/products/Mo-99_Bel.pdf (2009). Accessed (Jun. 1, 2010).
Meade, C. et al., "Considering the Effects of a Catastrophic Terrorist Attack," RAND Center for Terrorism Risk Management Policy Report, (2006).
Mirzadeh, S., "Production Capabilities in U.S. Nuclear Reactors for Medical Radioisotopes," ORNL report, ORNL/TM-12010, (Nov. 1992).
Mutalib, A., "Full Scale Demonstration of the Cintichem Process for the Production of Mo-99 Using a Low Enriched Target," ANL Report ANL/CMT/CP-97560, (Sep. 1999).
Newsline, "Shortage of Molybdenum-99 Due to Strike at NRU Reactor," The Journal of Nuclear Medicine, 38:8, (Aug. 1997).
Nickles, R.J. "Production of a Broad Range of Radionuclides with an 11 MeV Proton Cyclotron," J Label Comp Radiopharm 30:120 (1991).
Nortier, F.M. et al., "Investigation of the thermal performance of solid targets for radioisotope production," Nucl. Instr. and Meth. A 355:236 (1995).
Ogawa, K; et al., "Development of solution behavior observation system under criticality accident conditions in TRACY," Journal of Nuclear Science and Technology 37:12:1088-1097 (Dec. 2000).
Osso, J.A., "Preparation of a Gel of Zirconium Molybdate for use in the Generators of 99Mo-99mTc Prepared with 99Mo Produced by the 98Mo(n,γ)99Mo Reaction," 1998 International Meeting on Reduced Enrichment for Research and Test Reactors, (Oct. 18-23, 1998).
Piefer, G. "Performance of a Low Pressure, Helicon Driven IEC Helium-3 Fusion Device," Ph.D. Thesis (Dec. 2006).
Risler, R., "20 Years of Clinical Therapy Operation with the Fast Neutron Therapy System in Seattle," Proceedings of the Seventeenth International Conference on Cyclotrons and Their Applications, (Oct. 18-22, 2004).
Schueller, M.J. et al., "Production and Extraction of 10CO2 From Proton Bombardment of Molten 10B2O3." Am Inst Physics Press (Oct. 2002).

Sherman, J. "High-Current Proton and Deuterium Extraction Systems," *Procedings of the 2007 Particle Accelerator Conference*, Albuquerque, NM: 1835 (2007).
Sherman, J.D. et al., "A 75-keV, 140-mA Proton Injector," Rev. of Scientific Instruments 73:2 917 (Feb. 2002).
Sherman, J.D. et al., "Proton Injector for cw-Mode Linear Accelerators," AIP Conf. Proc. 1099: 102 (2008).
Song, Z. et al., "Minipermanent Magnet High-Current Microwave Ion Source," Rev. of Sci. Instrum. 77 03A305 (2006).
Stacey, W.M, "Capabilities of a DT Tokamak Fusion Neutron Source for Driving a Spent Nuclear Fuel Transmutation Reactor," Nuclear Fusion, 41:2:135-154 (2001).
Taylor, T. et al., "An Advanced High-Current Low-Emittance dc Microwave Proton Source," Nucl. Instrum. and Methods in Phys. Res Part A 336:1 (1993).
Underhill, DW. "The Adsorption of Argon, Krypton and Xenon on Activated Charcoal," Health Phs. 71:2:160-166 (1996).
Vandegrift, G. "ANL (GFV) Perspective on Conversion of Mo-99 Production from High-to Low-Enriched Uranium," Presentation to the National Academies Committee on Medical Isotope Production without Highly Enriched Uranium, Washington D.C. (Apr. 10, 2007).
Vandegrift, G. F. et al., "RERTR Progress in Mo-99 Production from LEU," 6th International Topical Meeting Research Reactor Fuel Management (RRFM), Ghent, Belgium, Mar. 17-20, 2002.
Vandegrift, G.F. et al. "Production of Mo-99 from LEU Targets Base-side Processing," Meeting on Reduced Enrichment for Research and Test Reactors, Las Vegas, Nevada, (Oct. 1-6, 2000).
Von Hippel, F.N. et al., "Feasibility of Eliminating the Use of Highly Enriched Uranium in the Production of Medical Radioisotopes," Science and Global Security, 14:151-162 (2006).
Vucina, J. L. "Elution Efficiency of Mo-99/Tc-99m Generators," Facta Universitatis—Series: Physics, Chemistry and Technology, 2:3:125-130 (2001).
Weidner, J.W. et al. "Production of 13N via Inertial Electrostatic Confinement Fusion," Fusion Science and Technology 44: 539 (2003).
William, B. et al., "Proliferation Dangers Associated with Nuclear Medicine: Getting Weapons-Grade Uranium Out of Radiopharmaceutical Production," Medicine, Conflict and Survival, 23:4:267-281 (Dec. 2007).
Zabetakis, M.G., "Flammability Characteristics of Combustible Gases and Vapors," Bullletin 627, US Bureau of Mines (1965).
Ziegler, J. "Stopping and Range of Ions in Matter," www.srim.org (2008) Accessed (Jun. 1, 2010).
Bussard, R.W. "Some Physics Considerations of Magnetic Inertial-Electrostatic Confinement: A New Concept for Spherical Converging-flow Fusion," Fusion Technology 19: 273 (1991).
Collins, K.E. et al., "Extraction of High Specific Activity Radionuclides from Reactor-Irradiated [alpha]—Phthalocyanine Targets," Radiochem. Radioanalyt. Left. 41: 129-132 (1979).
DeJesus, O.T. et al., "Production and Purification of Zr-89, a Potential PET Antibody Label," Appl. Radiat. Isotopes., Int.J. Radiat. Appl. Instr. Part A, 41:789-790 (1990).
Galy, J. et al., "A Neutron Booster for Spallation Sources-Application to Accelerator driven Systems and Isotope Production," Nuc. Instr. & Methods in Physics Res., 485:3:739-752 (2002).
Hirsch, R. L. "Inertial-Electrostatic Confinement of Ionized Fusion Gases" J. App. Phys. 38:4522-4534 (1967).
Kulcinski, G. L., "Non-electric power, near term applications of fusion energy" 18th Symposium on Fusion Engineering, Albuquerque, NM, USA (1999) 5-8.
Lone, M.A., "Syrup Neutron Cross Sect. 10-40 JV1eV. Rep.:" BNL-NCS-50681, pp. 79-116 (1977).
Olhoett, G., "Applications and Frustrations in Using Ground Penetrating Radar," Aerospace and Electronics Systems Magazine, IEEE, 21:2:.12-20, (2002).
Radel et al., "Detection of Highly Enriched Uranium Using a Pulsed D—D Fusion Source," Fusion Science and Technology, vol. 52. No. 4, pp. 1087-1091 (2007).
Russoto, R.L. et al., "Measurement of fuel ion temperatures in ICF implosions using current mode neutron time of flight detectors" Review of Scientific Instrumentation, 61:10:3125-3127 (1990).

(56) References Cited

OTHER PUBLICATIONS

Sabatier, J.M., "A Study on the Passive Detection of Clandestine Tunnels," 2008 IEEE Conference on Technologies for Homeland Security, pp. 353-358, (May 12-13, 2008).
Schiller et al., "Electron Beam Technology," Wiley-Interscience p. 59; Fig. F (XP002545103) (1982).
Stolarczyk, L.G., "Detection of Underground Tunnels with a Synchronized Electromagnetic Wave Gradiometer," AFRL-VS-HA-TR-2005-1066, ARFL Technical Report, (2005).
Yoshikawa, K., et al., "Research and development of landmine detection system by a compact fusion neutron source", 16th Topical Meeting on Fusion Energy, Madison, WI, USA, O-1-6.4 (2004) 1224-1228.
Chinese Office Action for Application No. 200980123452.6 dated Feb. 17, 2013 (12 pages—English Translation).
Chinese Office Action for Application No. 200980123452.6 dated Feb. 11, 2014 (9 pages—English Translation).
Japanese Office Action for Application No. 2011/507694 dated Jun. 4, 2013 (Translation and Original, 9 pages).
PCT/US2011/23024 International Search Report and Written Opinion dated Dec. 6, 2011 (14 pages).
International Search Report and Written Opinion for Application No. PCT/US2013/031837 dated Dec. 6, 2013 (9 pages).
PCT/US2008/088485 International Search Report and Written Opinion dated Dec. 18, 2009 (14 pages).
PCT/US2009/042587 International Preliminary Report on Patentability dated Nov. 11, 2010 (9 pages).
PCT/US2009/042587 International Search Report and Written Opinion dated Dec. 16, 2009 (9 pages).
Chinese Patent Office Action for Application No. 200980123452.6 dated Oct. 23, 2014 (14 pages, English translation included).
United States Patent Office Action for U.S. Appl. No. 12/990,758 dated May 7, 2014 (14 pages).
Japanese Patent Office Action for Application No. 2011-507694 dated Feb. 9, 2015 (3 pages—Statement of relevance included).
Korean Patent Office Action for Application No. 10-2010-7027045 dated Mar. 30, 2015 (10 pages—English translation included).
United States Patent Office Action for U.S. Appl. No. 12/990,758 dated Mar. 23, 2015 (17 pages).
United States Patent Office Action for U.S. Appl. No. 13/575,826 dated Apr. 20, 2015 (13 pages).
Japanese Patent Office action for Application No. 2013-249823 dated Nov. 10, 2014 (2 pages—Statement of relevance included).
Japanese Patent Office Action for Application No. 2013-249823 dated Oct. 15, 2015 (6 pages) English translation only.
Canadian Patent Office Action for Application No. 2723224 dated Jun. 5, 2015 (5 pages).
Chinese Patent Office Action for Application No. 200980123452.6 dated Apr. 22, 2015 (7 pages, English translation included).
Korean Patent Office Action for Application No. 10-2016-7015856 dated Sep. 27, 2016 (11 pages with English translation).
Japanese Patent Office Action for Application No. 2013-249823 dated Aug. 16, 2016 (3 pages with English translation).
United States Patent Office Action for U.S. Appl. No. 13/575,826 dated Feb. 5, 2016 (13 pages).
Canadian Patent Office Action for Application No. 2723224 dated Jun. 10, 2016 (3 pages).
Korean Patent Office Action for Application No. 10-2010-7027045 dated Feb. 15, 2016.
Chinese Patent Office Action for Application No. 201380018865.4 dated Feb. 2, 2016.
European Patent Office Action for Application No. 09739965.3 dated Nov. 26, 2015.
United States Patent Office Action for U.S. Appl. No. 12/990,758 dated Jul. 21, 2016 (14 pages).
Russian Patent Office Decision to Grant a Patent for Invention dated for Application No. 2014144290 Jan. 26, 2018 (14 pages).
Keele et al. "Solubility relations of uranyl fluoride-hydrofluoric acid-boric acid." Journal of Chemical and Engineering Data 17.3 (1972): 330-332.
United States Patent Office Action for U.S. Appl. No. 14/390,658 dated Apr. 20, 2018 (14 pages).
Chinese Patent Office Action for Application No. 2013800188654 dated Jul. 26, 2017 (16 pages, English translation included).
Chinese Patent Office Action for Application No. 201510976878.3 dated Mar. 3, 2017 (22 pages, English translation included).
United States Patent Office Action for U.S. Appl. No. 13/575,826 dated Jul. 27, 2018 (17 pages).
Chinese Patent Office Action for Application No. 2013800188654 dated Apr. 17, 2018 (7 pages, English translation included).
Chinese Patent Office Action for Application No. 201510976878.3 dated Nov. 13, 2017 (10 pages).
United States Patent Office Action for U.S. Appl. No. 13/575,826 dated Nov. 24, 2017 (20 pages).
Russian Patent Office Action for Application No. 2014144290 dated Oct. 31, 2016 (12 pages with English translation).
Chinese Patent Office Action for Application No. 201380018865.4 dated Nov. 28, 2016 (17 pages with English translation).
United States Patent Office Action for U.S. Appl. No. 13/575,826 dated Feb. 21, 2017 (17 pages).
United States Patent Office Notice of Allowance for U.S. Appl. No. 12/990,758 dated Apr. 10, 2017 (8 pages).
Canadian Patent Office Action for Application No. 2,723,224 dated Mar. 30, 2017 (4 pages).
Canadian Patent Office Action for Application No. 2,869,559 dated Jan. 25, 2019 (4 pages).
United States Patent Office Action for U.S. Appl. No. 14/390,658 dated Dec. 28, 2018 (14 pages).
United States Patent Office Action for U.S. Appl. No. 13/575,826 dated Mar. 15, 2019 (23 pages).
United States Patent Office Action for U.S. Appl. No. 15/644,497 dated Jul. 16, 2019 (17 pages).
United States Patent Office Action for U.S. Appl. No. 14/390,658 dated Jul. 18, 2019 (11 pages).
Korean Patent Office Action for Application No. 10-2014-7031068 dated Aug. 28, 2019 (10 pages, English translation included).
Canadian Patent Office Action for Application No. 2,869,559 dated Jan. 22, 2020 (4 pages).
United States Patent Office Action for U.S. Appl. No. 15/644,497 dated Feb. 10, 2020 (16 pages).
United States Patent Office Action for U.S. Appl. No. 14/390,658 dated Apr. 6, 2020 (11 pages).
United States Patent Office Action for U.S. Appl. No. 13/575,826 dated May 18, 2020 (28 pages).

\* cited by examiner

METHODS OF SEPARATING MEDICAL ISOTOPES FROM URANIUM SOLUTIONS

CROSS-REFERENCE TO RELATED APPLICATIONS

This application claims priority to U.S. Provisional Patent Application No. 61/480,214, filed Apr. 28, 2011, which is incorporated herein by reference in its entirety.

INTRODUCTION

Medical isotopes are used to diagnose and treat approximately 40 million patients per year. The vast majority of these isotopes are created by the fission of uranium, in which a form of incident radiation strikes uranium nuclei and causes them to split into smaller "fission product" isotopes. The fission products contain a range of different isotopes, some of which have medical significance including Mo-99, I-131, Xe-133, and others. These fission-based isotopes are presently used in greater than 85% of the nuclear medicine procedures performed today.

Present methods to create medical isotopes typically involve using a high flux, critical nuclear reactor to create neutrons, and placing a specially designed solid uranium target proximal to the reactor core. Some neutrons produced by the reactor strike the uranium target, causing fission which creates the various isotopes. The isotopes remain embedded in the solid uranium target throughout the irradiation. After a period of time (typically several days), the reactor is shut down, and the solid target is withdrawn from its proximal location. The solid target is then moved to a processing area where it is converted to a liquid form by dissolution in acid. Once in liquid form, a variety of chemical processes are performed on the target to extract the desired isotopes. After these isotopes are extracted, the remaining solution is disposed of and not re-used.

During the irradiation and separation process, very little uranium is consumed, and nearly all of it is thrown away after the dissolution process. In addition, the separation takes extra time, often several hours, during which the desired isotopes undergo radioactive decay. These extra hours result in a loss of product that could be used in nuclear medicine procedures.

Finally, the process of irradiating a solid uranium target requires a very high reactor flux to obtain a high yield of medical isotopes, because relatively few neutrons created by the reactor actually make their way to the target. These reactors are also very expensive and produce a high level of nuclear waste (typically hundreds of times more) in comparison to the expense and waste generated using aqueous systems.

SUMMARY

The present disclosure relates to methods of separating medical isotopes from a solution of uranium salts.

In one aspect, the disclosure provides a method of separating medical isotopes from uranium solutions. In an aspect, the disclosure relates to methods of separating an isotope from a first solution including uranium. The methods may suitably include (a) cleaning the first solution to form a second solution including the uranium and a third solution including the isotope; and (b) separating the isotope. In some embodiments, the method may further comprise oxidizing the isotope prior to step (b).

In another aspect, the disclosure relates to methods of producing medical isotopes. The methods may suitably include (a) irradiating a uranium solution to form a first solution including uranium and a daughter isotope; (b) contacting the first solution with a chemical separation medium to form a second solution including the uranium and a third solution including the daughter isotope; and (c) separating the daughter isotope from the third solution.

In a further aspect, the disclosure relates to methods of producing medical isotopes. The methods may suitably include (a) irradiating a uranium solution to form a first solution including uranium and an isotope; (b) extracting the isotope from the first solution; and (c) contacting a solution resulting from step (b) with a chemical separation medium to form a second solution including the uranium.

In yet another aspect, the disclosure relates to methods of producing isotopes. The methods may suitably include irradiating a uranium solution to yield a daughter isotope; separating remaining uranium from the solution; separating the daughter isotope from the solution; and extracting the daughter isotope.

The disclosure relates to other aspects and embodiments which will become apparent in view of the description and accompanying drawings.

DETAILED DESCRIPTION

In a general sense, the disclosure relates to methods and compositions for separating medical isotopes from a uranium solution. Medical isotopes may be generated in uranium solutions in, for example, aqueous nuclear reactor systems. An aqueous nuclear reactor or aqueous uranium target driven by an accelerator reduces some of the inefficiencies of solid target systems. In an aqueous system, uranium is dissolved into a liquid form (typically a nitrate or sulfate form) and irradiated to produce the desired isotopes. In certain embodiments, the uranium solution may suitably include at least one of uranyl nitrate, uranyl sulfate, uranyl fluoride, and uranyl phosphate, or a combination thereof. The incident radiation is either produced internally (in the case of a critical reactor) or externally (in the case of an accelerator-driven system). Fission occurs in the liquid as the irradiation proceeds and typically ceases after several days.

Either during or after the irradiation in aqueous systems, the uranium solution may be pumped to a separation filter that pulls out the medical isotopes of relevance. There is no need to dissolve the target as the medical isotopes are already in aqueous form, saving time and allowing for more of the rapidly decaying isotopes to reach their ultimate destination. Once the isotopes are separated, the uranium remains in solution and can be returned to the irradiation device for reuse. As such, an aqueous system can make more efficient use of the uranium. The separation of uranium and medical isotopes may be done continuously in a system of extraction and recycling. Alternatively, uranium and medical isotopes may be separated periodically, such as, for example, in a system of extraction and recycling during periods when the aqueous system is not irradiating.

Another advantage of an aqueous system is that the driving radiation is either internal (critical reactor) or directed (accelerator-driven system), and a substantial portion of the produced radiation contributes to isotope production. Highly efficient utilization of the incident radiation results in a tremendous reduction in nuclear waste. Finally, since these systems are relatively simple and small compared to a high flux reactor, they may be less expensive and safer to operate.

Another advantage of an aqueous system is that the incident radiation flux in an aqueous system may be lower than in conventional methods such as those using a high flux reactor. A lower incident radiation flux can be used and still maintain similar rates of isotope production by using a larger volume of solution, by operating with a higher concentration of uranium in solution, or by a combination of these two. However, operation with a very high volume of uranium solution has the disadvantage of requiring a greater total amount of radiation and requiring more time for processing to isolate the desired isotopes. Operating at high uranium concentrations may increase the difficulty of separating the desired isotopes from the uranium solution.

It is known that aqueous systems have other potential disadvantages, e.g., in systems that reuse uranium, impurities build up in the system with each subsequent irradiation. Eventually, these impurities will build up to the point where the medical isotope product is difficult to purify to a degree of purity suitable for medical use. At this time, the uranium solution should be discarded and replaced, which wastes most of the uranium. Replacement of the uranium is expensive and results in a greater total waste volume.

Another disadvantage with aqueous systems is that the oxidation state of an important medical isotope, such as Mo-99, may be altered from its ideal state by the harsh environment of the reactor. While Mo-99 can be returned to the proper state by chemical reaction, the reagents needed often confound reuse of the solution in the reactor, and they may be difficult to subsequently separate.

In certain aspects of the methods disclosed herein, uranium, which may be reused in the aqueous system, and the desired isotopes may be separately isolated in a manner that overcomes many disadvantages of aqueous systems as discussed above. Isotopes or radioisotopes may include a medical isotope. Medical isotopes may include, but are not limited to, Mo-99, I-131, I-125, In-111, Xe-133, Y-90, Pd-103, Ru-106, and Cs-137. The methods disclosed herein may be particularly advantageous with respect to high concentration uranium solutions. For example, the first solution including uranium may include uranium in an amount or concentration of at least about 10 g/L, at least about 12 g/L, at least about 14 g/L, at least about 16 g/L, at least about 18 g/L, or at least about 20 g/L. The first solution including uranium may include uranium in an amount or concentration of less than about 1000 g/L, less than about 900 g/L, less than about 800 g/L, or less than about 700 g/L. The first solution including uranium may include uranium in an amount or concentration of about 10 to about 1000 g/L, about 12 to about 900 g/L, about 14 to about 800 g/L, or about 16 to about 700 g/L.

Figure 1:
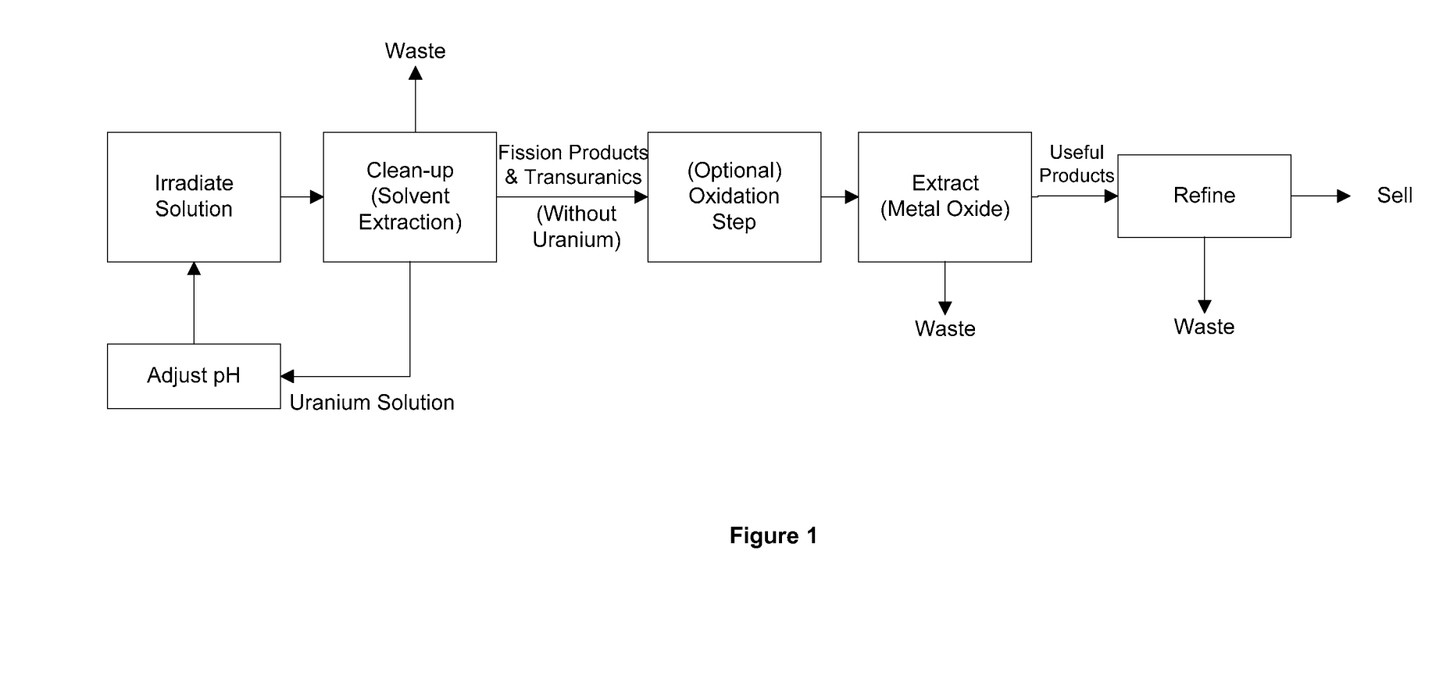
FIG. 1 is a flowchart of a method to separate medical isotopes from uranium solutions, according to one aspect of the disclosure.

In an aspect, the disclosure provides methods of separating an isotope from a first solution including uranium, wherein uranium is extracted from the first solution before the isotopes (i.e., daughter isotopes, e.g., medical isotopes) are separated. FIG. 1 is a flow chart generally illustrating one embodiment of the disclosed methods to separate medical isotopes from uranium solutions. The method includes an irradiation step in an aqueous system followed by a solution cleanup step (to separate uranium), followed by an extraction step (to separate isotopes) and chemistry adjustment (for the recycled uranium), followed by an extraction step for the medical isotopes. Steps after the initial irradiation step may be varied. For example, in certain embodiments, the solution cleanup step may be implemented between the irradiation and extraction steps.

In certain embodiments, the disclosure provides a method of separating an isotope from a first solution including uranium, the first solution generated by irradiation in an aqueous system. The methods may suitably include (a) cleaning the first solution to form a second solution including the uranium and a third solution including the isotope; and (b) separating the isotope from the third solution.

The solution cleanup step (e.g., the step to clean the first solution to form a second solution including the uranium and a third solution including the isotope) includes a process that substantially separates uranium from the first solution before the isotopes are extracted. Once the uranium is removed, an oxidation step may be implemented without detriment to subsequent separation or reaction steps because the solution at that point will no longer be reused in the reactor. Separation of uranium from the first solution before extracting isotopes also allows for simpler chemical processes to remove the medical isotopes from the remaining solution. After separation of the useful isotopes, the remaining byproducts are disposed of. The uranium that is separated is very pure, and may go back into the aqueous system for irradiation. Unlike in previously described systems, impurities are not able to build up and the uranium remains reusable until it is completely consumed.

Methods that may be used to separate the uranium in the solution cleanup step include any solvent extraction process known in the art. Examples of solvent extraction processes include, but are not limited to, a UREX process, a PUREX process, and a TRUEX process. Examples of UREX processes are described in M. C. Thompson et al. ("Demonstration of the UREX Solvent Extraction Process with Dresden Reactor Fuel Solution," Westinghouse Savannah River Company, Sep. 30, 2002, WSRC-TR-2002-00444) and Schroeder et al. ("Technetium and Iodine Separations in the UREX Proces," Accelerator Transmutation of Waste Program, 2001, Final Report for WBS 1.24.01.01), which are incorporated herein by reference in their entireties.

Figure 2:
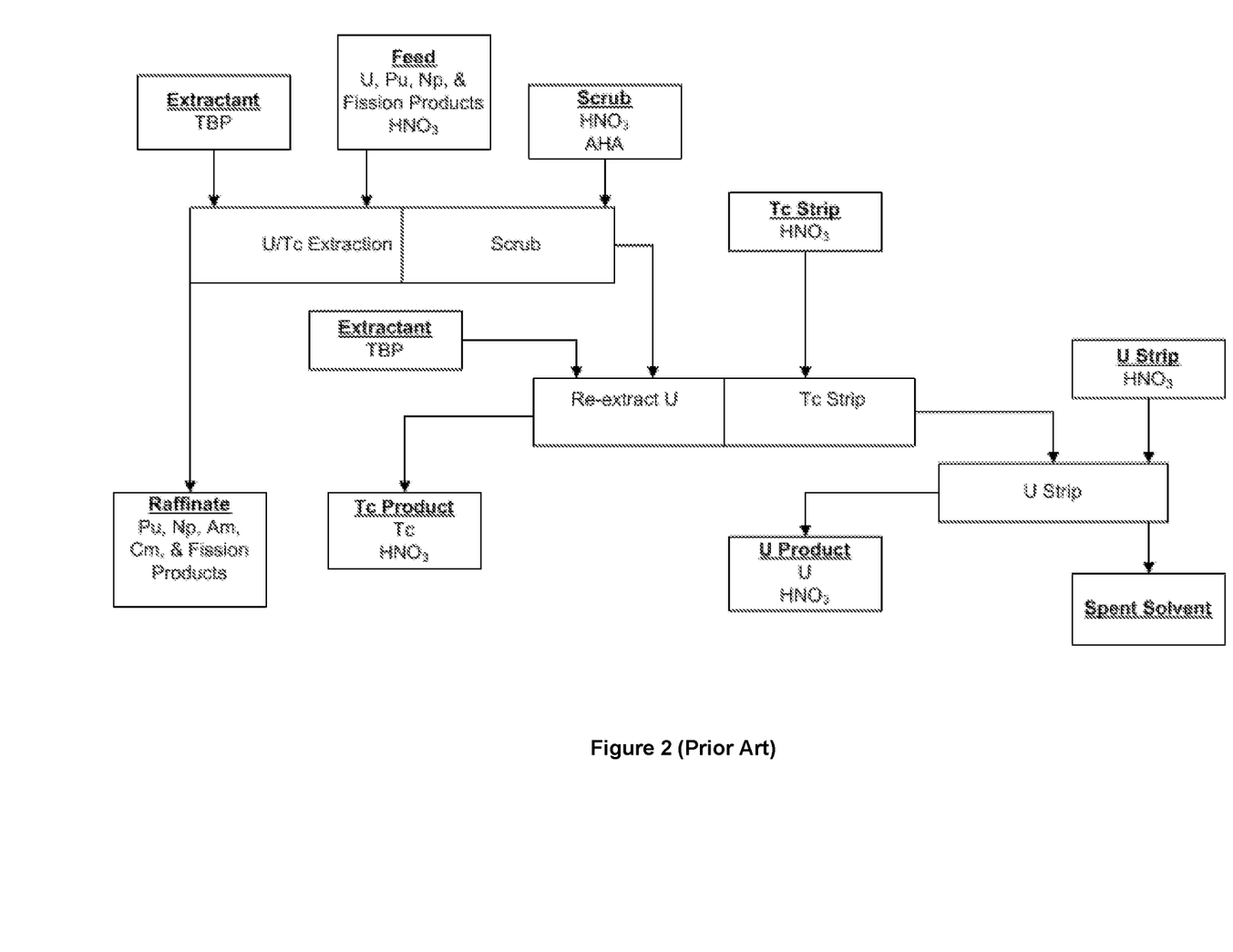
FIG. 2 is a flowchart of a solvent extraction process, which may be used as the clean-up step of the method illustrated in FIG. 1.

One such UREX solvent extraction process is illustrated in FIG. 2. In this process, uranium is separated from a solution by addition of an effective amount of tri-butyl phosphate (TBP) and acetohydroxamic acid (AHA). The solution from which uranium is separated may be the feed material, which as used herein, refers to the solution after irradiation in the aqueous system that includes uranium and desired isotopes and other fission products (FP). Acetohydroxamic acid complexes Pu(IV) and Np(IV) to prevent them from be extracted and reduces Np(VI) to non-extractable Np(V). "Effective amount" refers to a concentration or amount of a compound or composition effective for eliciting a desired effect, such as an amount effective to separate uranium from a solution. The resulting raffinate, i.e., the solution after separation and without uranium, does not contain substantial amounts of uranium and may be passed or cycled back to the extraction process included in FIG. 1.

As shown in FIG. 2, additional separation steps may be done in a UREX process to separate any remaining Tc from the feed, resulting in a waste Tc feed and very pure uranium. The separated uranium may be returned back to the aqueous reactor for irradiation and an additional cycle of isotope production. In some embodiments, the uranium and isotope separation may be part of a continuous loop with the aqueous reactor. In some embodiments, the uranium and isotope separation may be done in batches and in between operational periods of the aqueous reactor. In certain embodiments, uranium may be separated by contacting a solution comprising the uranium with a chemical separation medium. As used herein, the term "a chemical separation medium" refers to a composition, solution, medium, or resin including components for a solvent extraction process. For example, the chemical separation medium may be a solution including an effective amount of tri-butyl phosphate and acetohydroxamic acid, as is used in a UREX process.

Once the uranium is separated, the desired daughter isotope in the remaining solution can be separated, for example, by applying the solution to or passing the solution through a metal oxide column or resin or medium. Metal oxides may include, but are not limited to, alumina, titania, zirconia, as well as alloys and combinations thereof. Suitably, the isotope is bound by the metal oxide column. In certain embodiments, an appropriate oxidizer is optionally added to the solution to restore the isotopes (most significantly, Mo-99) to the proper oxidation state for separation. The isotope may also be oxidized before applying it to the metal oxide. Alternatively, an oxidizer may be applied to the isotope during or after application to the metal oxide. For example, in some embodiments, the oxidizer may be added to a metal oxide column with isotope to elute the isotope from the column. Oxidizers may include, but are not limited to, hydrogen peroxide, potassium permanganate, sodium hypochlorite, and molecular oxygen. Optionally, the pH may be raised to a suitable pH to aide elution of a desired isotope from the metal oxide. For example, the pH adjusters may include, but are not limited to, sodium hydroxide, ammonium hydroxide, and other suitable basic solutions. As such, the isotope may be separated by elution from the metal oxide.

Separation of uranium before extraction of isotopes has many advantages. The beneficial effects of separating uranium before extraction of the isotopes include increased uranium lifetime, as well as increased separation efficiency of Mo-99 and other isotopes. Furthermore, the system can operate with a higher uranium concentration, thereby minimizing uranium costs and solution volumes. Additionally, impurity buildup in the uranium solution is substantially reduced.

In another aspect, the disclosure provides methods of separating an isotope from a first solution including uranium, wherein the isotope is extracted from the first solution before the uranium is separated. In certain embodiments, methods of producing medical radioisotopes are provided, wherein the methods may suitably include (a) irradiating a uranium solution to form a first solution including uranium and an isotope; (b) extracting the isotope from the first solution; and (c) contacting a solution resulting from step (b) with a chemical separation medium to form a second solution including the uranium. The isotope may be optionally oxidized as described above. The isotope may be extracted from the first solution as described above, for example, using a metal oxide column. The uranium may be separated using a chemical separation medium as described above, for example, using a UREX process.

It is to be understood that the invention is not limited in its application to the details of construction and the arrangement of components set forth in this description or illustrated in the following figures. The invention is capable of other embodiments and of being practiced or of being carried out in various ways. The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including but not limited to") unless otherwise noted. The use of "including," "including," "having," and variations thereof herein is meant to encompass the items listed thereafter and equivalents thereof as well as additional items. "Including" encompasses the terms "consisting of" and "consisting essentially of." The use of "consisting essentially of" means that the composition or method may include additional ingredients and/or steps, but only if the additional ingredients and/or steps do not materially alter the basic and novel characteristics of the claimed composition or method. All methods described herein can be performed in any suitable order unless otherwise indicated herein or otherwise clearly contradicted by context. The use of any and all examples, or exemplary language (e.g., "such as") provided herein, is intended merely to illustrate aspects and embodiments of the disclosure and does not limit the scope of the claims. Unless otherwise noted, technical terms are used according to conventional usage.

All publications, patents and patent applications referenced in this specification are indicative of the level of ordinary skill in the art to which this application pertains. All publications, patents and patent applications are herein expressly incorporated by reference to the same extent as if each individual publication or patent application was specifically and individually indicated by reference. In case of conflict between the present disclosure and the incorporated patents, publications and references, the present disclosure should control.

Thus, the disclosure provides, among other things, a method to separate medical isotopes from uranium solutions with an integrated cleanup step. Various features and advantages of the disclosure are set forth in the following claims.

What is claimed is:

1. A method of separating a desired isotope from a first solution comprising uranium, the method comprising:
    a) cleaning the first solution to form a second solution comprising uranium and a third solution comprising the desired isotope; then
    b) oxidizing the desired isotope; and then
    c) applying the third solution to a medium to separate the desired isotope from the third solution, wherein the medium does not include a solvent extraction process, and wherein the desired isotope is selected from the group consisting of Mo-99, I-131, I-125, In-111, Xe-133, Y-90, Pd-103, Ru-106, and Cs-137.

2. The method of claim 1, wherein step (a) comprises a solvent extraction process.

3. The method of claim 2, wherein the solvent extraction process comprises a UREX process.

4. The method of claim 3, wherein the UREX process comprises treating the first solution with an effective amount of tributyl phosphate and acetohydroxamic acid.

5. The method of claim 1, wherein the desired isotope comprises Mo-99.

6. The method of claim 1, wherein the first solution comprises uranium in an amount of at least about 10 g/L.

7. The method of claim 1, wherein the medium of step (c) comprises a metal oxide column.

8. A method of producing desired isotopes, the method comprising:
   a) irradiating a uranium solution to form a first solution comprising uranium and a daughter isotope; then
   b) contacting the first solution with a chemical separation medium to form a second solution comprising the uranium and a third solution comprising the daughter isotope; and then
   c) oxidizing the third solution and then applying the third solution to a medium to separate the daughter isotope from the third solution, wherein the medium does not include a solvent extraction process, and wherein the daughter isotope comprises a desired isotope selected from the group consisting of Mo-99, I-131, I-125, In-111, Xe-133, Y-90, Pd-103, Ru-106, and Cs-137.

9. The method of claim 8, wherein the uranium solution of step (a) comprises uranium in an amount of at least about 10 g/L.

10. The method of claim 8, wherein the desired isotope comprises Mo-99.

11. The method of claim 8, wherein step (b) comprises a solvent extraction process.

12. The method of claim 11, wherein the solvent extraction process comprises a UREX process.

13. The method of claim 11, wherein step (b) comprises treating the first solution with an effective amount of tributyl phosphate and acetohydroxamic acid.

14. The method of claim 8, further comprising returning the uranium from the second solution to a reaction vessel for irradiation.

15. The method of claim 8, wherein the medium of step (c) comprises an alumina column.

16. A method of producing isotopes, comprising:
   a) irradiating a uranium solution to yield a daughter isotope; then
   b) separating the remaining uranium from the solution; then
   c) oxidizing the daughter isotope; then
   d) applying the solution to a medium to separate the daughter isotope from the solution, wherein the medium does not include a solvent extraction process; and then
   e) extracting the daughter isotope, wherein the daughter isotope comprises a desired isotope selected from the group consisting of Mo-99, I-131, I-125, In-111, Xe-133, Y-90, Pd-103, Ru-106, and Cs-137.

17. The method of claim 16, further comprising returning the remaining uranium in step (b) to step (a) for irradiation.

* * * * *